(12) United States Patent
Lam et al.

(10) Patent No.: US 10,599,877 B2
(45) Date of Patent: Mar. 24, 2020

(54) PROTECTING CONTENT ON A DISPLAY DEVICE FROM A FIELD-OF-VIEW OF A PERSON OR DEVICE

(71) Applicant: AT&T Intellectual Property I, L.P., Atlanta, GA (US)

(72) Inventors: Yeeling Lam, Bridgeton, MO (US); Daniel Solero, Mooresville, IN (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 383 days.

(21) Appl. No.: 15/487,129

(22) Filed: Apr. 13, 2017

(65) Prior Publication Data

US 2018/0300510 A1    Oct. 18, 2018

(51) Int. Cl.
*G06F 21/84* (2013.01)
*G06F 21/57* (2013.01)
*G06F 21/62* (2013.01)

(52) U.S. Cl.
CPC ............ *G06F 21/84* (2013.01); *G06F 21/577* (2013.01); *G06F 21/6245* (2013.01)

(58) Field of Classification Search
CPC ..... G06F 21/84; G06F 21/577; G06F 21/6245
See application file for complete search history.

(56) References Cited

U.S. PATENT DOCUMENTS

| | | | | |
|---|---|---|---|---|
| 8,922,480 B1* | 12/2014 | Freed | ...................... | G09G 5/00 345/156 |
| 8,973,149 B2 | 3/2015 | Buck | | |
| 9,172,705 B1* | 10/2015 | Kong | .................... | H04L 47/801 |
| 9,355,612 B1* | 5/2016 | Shepard | ................ | G09G 5/006 |
| 9,898,610 B1* | 2/2018 | Hadsall | ............... | G06F 21/6245 |
| 9,977,909 B1* | 5/2018 | Austin | ................ | G06F 3/04883 |
| 10,043,014 B1* | 8/2018 | Hadsall | ............... | G06F 21/6245 |
| 10,311,249 B2* | 6/2019 | Sharifi | ................ | G06F 21/6245 |
| 2004/0103325 A1* | 5/2004 | Priebatsch | ............. | G06F 21/31 726/6 |
| 2008/0022133 A1* | 1/2008 | Sobel | .................. | G06F 21/6218 713/193 |

(Continued)

FOREIGN PATENT DOCUMENTS

| | | |
|---|---|---|
| CN | 102855453 | 1/2013 |
| JP | 2010128778 | 6/2010 |

OTHER PUBLICATIONS

"AntiSnooper: Blur Your Computer Screen Automatically", http://www.thewindowsclub.com/antisnooper-blur-computer-screen.

(Continued)

*Primary Examiner* — Joseph P Hirl
*Assistant Examiner* — Stephen T Gundry
(74) *Attorney, Agent, or Firm* — Kilpatrick Townsend & Stockton LLP (57) ABSTRACT

A server can receive data about attributes of user devices that includes sensors for capturing information about environments in which the user devices are located. The server can determine various risk profiles using the attributes. The risk profiles can indicate likelihoods of content on the user devices being viewed by persons other than users of the user device. The server can also transmit data indicating a risk profile of the various risk profiles to a user device. The user device can use the risk profile received from the server to identify confidential content displayed on the user device and protect the confidential content.

20 Claims, 6 Drawing Sheets

(56) References Cited

U.S. PATENT DOCUMENTS

| | | |
|---|---|---|
| 2011/0134470 A1 | 6/2011 | Naito |
| 2011/0179366 A1 | 7/2011 | Chae |
| 2011/0298817 A1 | 12/2011 | Oshinome |
| 2012/0326971 A1 | 12/2012 | Zhou |
| 2013/0007900 A1* | 1/2013 | Santhanu ............... G06F 21/31 726/30 |
| 2013/0247174 A1 | 9/2013 | Wada |
| 2013/0254874 A1 | 9/2013 | Xu |
| 2014/0013422 A1* | 1/2014 | Janus ..................... G06F 21/31 726/19 |
| 2014/0201805 A1* | 7/2014 | Riordan .................. G06F 21/60 726/1 |
| 2015/0003691 A1 | 1/2015 | Joo et al. |
| 2015/0113666 A1* | 4/2015 | Buck ...................... G06F 21/50 726/28 |
| 2015/0121506 A1* | 4/2015 | Cavanaugh ............. G06F 21/62 726/16 |
| 2015/0139612 A1 | 5/2015 | Lian |
| 2015/0163246 A1* | 6/2015 | Laadan ................ G06F 21/6245 726/1 |
| 2016/0099963 A1* | 4/2016 | Mahaffey ............ H04L 63/0227 726/25 |
| 2016/0188904 A1 | 6/2016 | Singh et al. |
| 2016/0188973 A1* | 6/2016 | Ziaja ....................... G06F 21/84 382/116 |
| 2016/0371504 A1 | 12/2016 | Huang et al. |
| 2017/0040002 A1* | 2/2017 | Basson ..................... G09G 5/37 |
| 2017/0192401 A1* | 7/2017 | Wexler ................. G06K 9/6267 |
| 2017/0337352 A1* | 11/2017 | Williams ................ G06F 21/10 |
| 2018/0081514 A1* | 3/2018 | Bostick ................... H04L 51/24 |
| 2018/0146004 A1* | 5/2018 | Belfiore, Jr. .......... G06F 21/577 |
| 2018/0197624 A1* | 7/2018 | Robaina ................... A61B 5/06 |

OTHER PUBLICATIONS

"How to Use Your Phone to Detect Hidden Surveillance Cameras at Home", http://www.makeuseof.com/tag/use-smartphone-detect-hidden-surveillance-cameras/.

\* cited by examiner

PROTECTING CONTENT ON A DISPLAY DEVICE FROM A FIELD-OF-VIEW OF A PERSON OR DEVICE

TECHNICAL FIELD

The present disclosure relates generally to user interface devices. More specifically, but not by way of limitation, this disclosure relates to protecting content displayed on a user interface device from a field-of-view of a person or other device.

BACKGROUND

Many devices include a display device that can be used to provide content to a user of the device. The content can include text, images, sounds, videos, etc. A spectator (e.g., another person near the device or looking at the device) may also view content provided on the display device. Another device near the device may also capture or view content on the display device. But, in some instances, the content provided on the display device may not be intended to be viewed by the spectator or the other device, but may nonetheless be exposed to view by the spectator or other device.

SUMMARY

In one example, a server of the present disclosure includes a processing device and a communication device for transmitting or receiving data via a network. The server also includes a non-transitory computer-readable medium communicatively coupled to the processing device. The processing device is configured to: receive data about attributes from user devices with sensors for capturing information about environments in which the user devices are located; and determine a plurality of risk profiles using the attributes. The plurality of risk profiles can indicate likelihoods of content on the user devices being viewed by persons other than users of the user devices. The processing device is also configured to transmit, to a first user device and using the communication device, data indicating a risk profile of the plurality of risk profiles. The risk profile can be used by the first user device for identifying confidential content displayed on the first user device and protecting the confidential content.

In another example, a user device of the present disclosure includes a display device and a communication device for transmitting or receiving data via a network. The user device also includes a sensor device configured for capturing information about a field of view of a third-party device or a person other than a user of the user device and a processing device. The user device further includes a non-transitory computer-readable medium communicatively coupled to the processing device. The non-transitory computer-readable medium comprises instructions that are executable by the processing device for: displaying, via the display device, content comprising public content and confidential content; receiving data from a server through the communication device; receiving, from the sensor device, captured information about the field of view of the third-party device or the person other than the user of the user device; identifying the confidential content displayed via the display device; using the data received from the server and the captured information to determine to protect the confidential content; and in response to determining to protect the confidential content, protecting the confidential content from view by the third-party device or the person other than the user of the user device.

In another example, a method of the present disclosure includes: receiving, by a processor of a server, data indicating a first attribute of a first user device; and training, by the processor, a machine-learning algorithm to determine a various risk profiles associated with various attributes using the first attribute of the first user device. A risk profile can indicate a likelihood of content on the first user device being viewed by a person other than a user of the user device. The method further includes: determining, by the processor and using the machine-learning algorithm, a first risk profile associated with the first attribute of the first user device; and transmitting, by the processor and to the first user device, data indicating the first risk profile. The first user device can use the first risk profile to identify confidential content displayed on the first user device and protect the confidential content.

The details of one or more aspects and examples are set forth in the accompanying drawings and the description below. Other features and aspects will become apparent from the description, the drawings, and the claims.

DETAILED DESCRIPTION

Certain aspects and features of the present disclosure relate to protecting content displayed on a user interface device based on a detected field-of-view of a person or another device. Protecting content can include, for example, preventing content displayed on a display of a computing device from being viewed by a person other than a user of the computing device or by another device.

In one example, a computing device, such as a smartphone or a tablet, includes a sensor and a display. The display can display or output various content (e.g., text, images, sounds, videos, animations, virtual objects, virtual animations, etc.). The sensor can detect a field-of-view or a direction of an eye gaze of a person, other than the user of the computing device, relative to the display. The sensor can then transmit a signal to a processor indicating the detected field-of-view of the other person and the processor determines whether the detected field-of-view of the other person is directed at or toward content displayed on the display. The processor can determine or identify confidential or sensitive content on the display (e.g., content on the display that is not intended to be viewed by a person other than the user of the computing device) and determine whether the confidential or sensitive content is within the field-of-view of the other person. The processor can control the display content and cause the confidential or sensitive content to change so that it is not viewable on the display. As an example, the processor transmits a signal to the display to cause the display to hide or blur the confidential content from view.

The sensor can also detect that the field-of-view or direction of the eye gaze of the other person is no longer directed at or toward the display of the computing device and, in response, transmits a signal to the processor indicating that the field-of-view or direction of the eye gaze of the other person is no longer directed at or toward the display. The processor can then transmit a signal to the display to reveal or unprotect the confidential content. As an example, the processor causes the display to unhide or not blur the confidential or sensitive content such that the user of the computing device can view the confidential or sensitive content.

The computing device can also or alternatively protect the confidential content based on a detected field-of-view of another device (e.g., a camera) near the computing device in substantially the same manner as described above. For example, the computing device determines that a camera is directed at or toward the display and can protect confidential content displayed on the display.

In some examples, the computing device determines an amount of the confidential content to hide or protect or a duration of time to hide the confidential content based on a detected field-of-view of the other person or the other device.

A server may be communicatively coupled to the computing device to receive data when the processor determines that the field-of-view or eye gaze of the other person is directed at or toward content on the display. For example, the processor transmits a location of the computing device, a type of the computing device, an application or program being executed by the processor, a type of network connection associated with the computing device, or any other data about the computing device when the field-of-view or eye gaze of the other person is directed at or toward content on the display. The server can determine a risk profile associated with a particular location, a particular type of computing device, a particular application or program, a particular type of network, etc. A risk profile can indicate a likelihood of content on the display being exposed to view by a person other than the user of the computing device. For example, the server determines a risk profile for a particular location that indicates that there is a high risk or likelihood that content on a display of a computing device at that location will be exposed to view by a person other than the user of the computing device. In some examples, the server determines the various risk profiles by training a machine-learning algorithm to determine the risk profiles.

The server can use the analysis to change the relative risk threshold by which other computing devices communicatively coupled to the server protect confidential or sensitive information. For example, the server obtains data from the other computing device indicating a location of the other computing device and transmits a signal to the processor of the other computing device to instruct the other computing device to protect confidential information even if that device has not detected a field-of-view of another person or camera. In some examples, the processor of the other computing device determines an amount of the confidential content to hide or protect based on a received risk profile from the server. In another example, the processor of the other computing device determines a duration of time to hide the confidential content based on the received risk profile. As an example, the processor of the other computing device receives a signal from the server indicating that a location of the other computing device is associated with a high risk-profile. In this example, the processor of the other computing device can hide a majority of the confidential content displayed on the other computing device.

In another example, a computing device can receive user input indicating a particular risk profile. If the computing device receives a low risk as a profile, such as if the user is at home, the computing device may only protect highly confidential information or only protect confidential information for a short amount of time from being viewed by a detected field-of-view of a non-user person or another device. If the computing device receives a high risk as a profile, such as if the user is at a highly populated area (e.g., an airport), the computing device may protect all or substantially all of the confidential information or protect the confidential information for an extended amount of time from being viewed by a field-of-view of a non-user person or another device.

In this manner, a computing device can protect certain confidential or sensitive content displayed on a display of the computing device from view by a person other than the user of the computing device based on the field-of-view of the other person.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative examples but, like the illustrative examples, should not be used to limit the present disclosure.

Figure 1A:
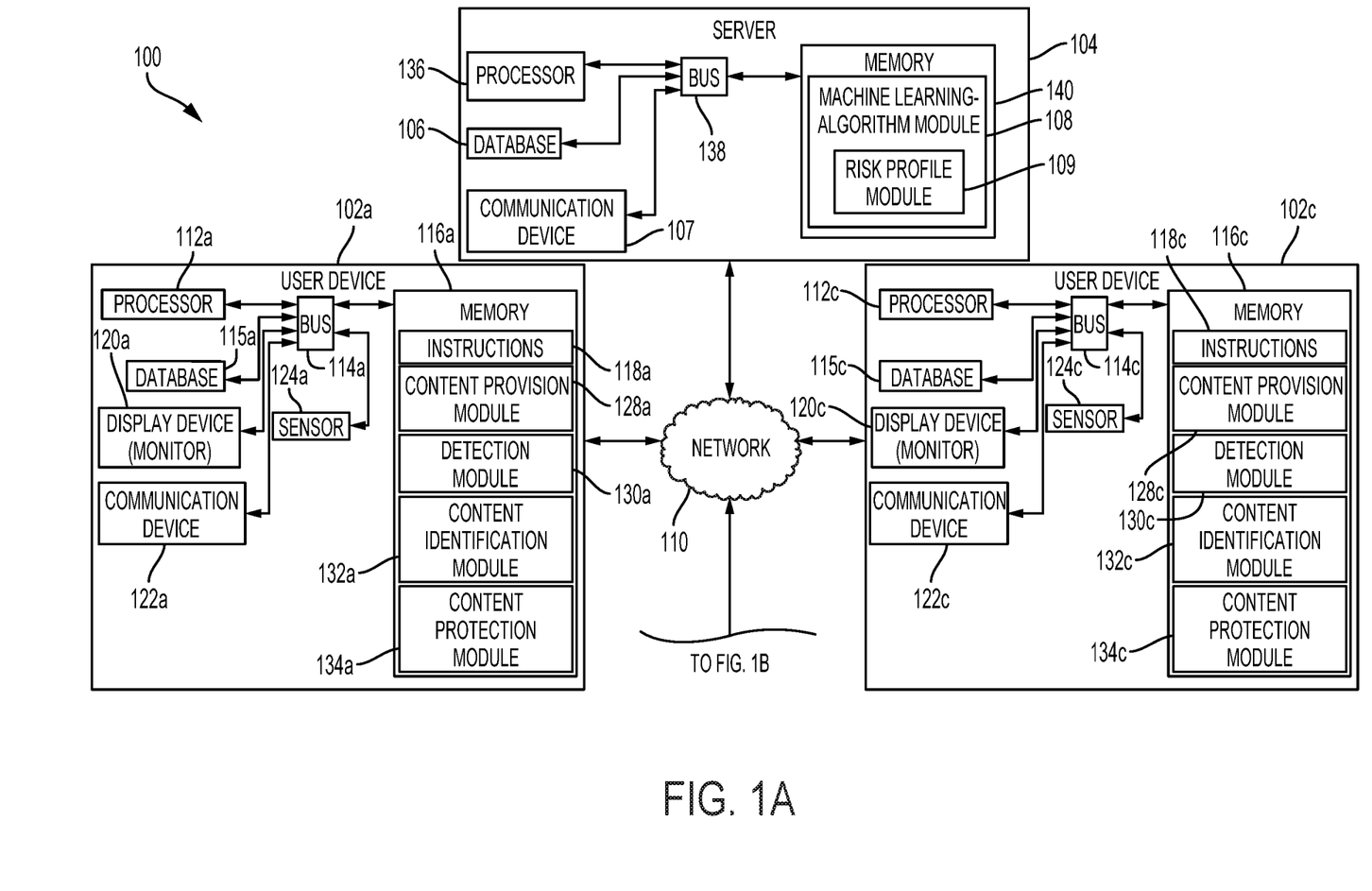
FIGS. 1A-B are block diagrams of an example of an environment in which a user device for protecting content based on a detected field-of-view can operate according to some aspects.
Figure 1B:
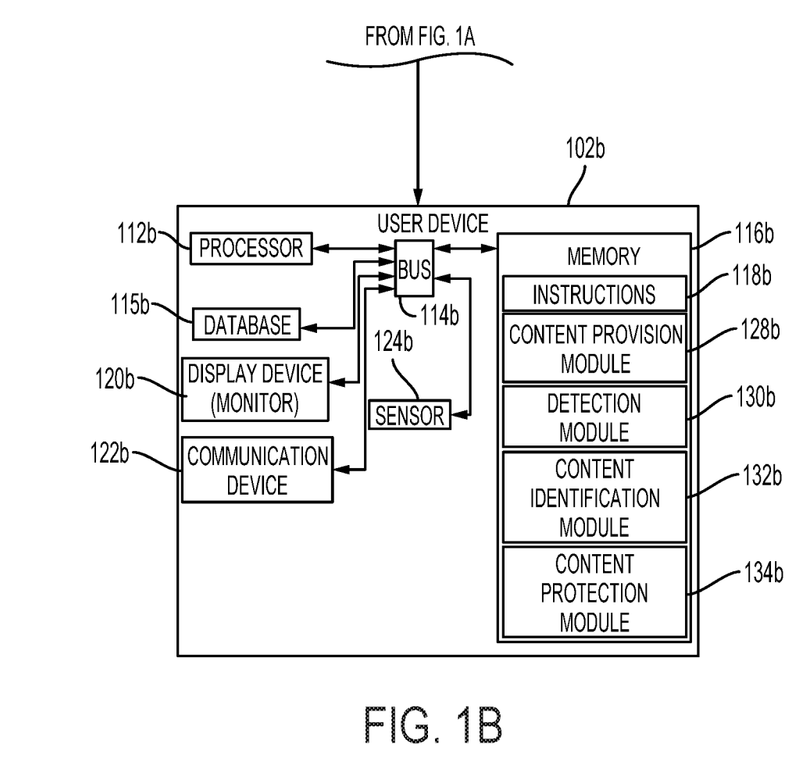

FIGS. 1A-B is a block diagram of an example of an environment 100 in which a user device 102*a-c* for protecting content based on a detected field-of-view can operate. The environment 100 includes user devices 102*a-c* and a server 104. Each user device 102*a-c* can communicate with another device (e.g., the server 104) via a network 110 or receive an indicia of user input (e.g., if a user programs the user device 102*a-c* to include data). The server 104 can transmit data to, or receive data from, any device in the environment 100 (e.g., the user devices 102*a-c*) or any other device. The server 104 can store data received or obtained in a database 106. In this example, the environment 100 also includes the network 110, which can be any network that facilitates communication of data by the user devices 102*a-c*, the server 104, or any other device in the environment 100.

Each user device 102*a-c* can be, for example, a mobile device, a smartphone, a laptop, tablet, e-reader, smartwatch, etc. In some examples, each user device 102*a-c* includes one or more components for protecting content based on a detected field-of-view. For example, the user device 102*a* includes a processor 112*a*, a bus 114*a*, a database 115*a*, and a memory 116*a*. The processor 112*a* can execute one or more instructions for operating the user device 102*a*. For example, the processor 112*a* executes instructions 118*a* stored in the memory 116*a* to perform the operations. Non-limiting examples of the processor 112*a* include a Field-Programmable Gate Array ("FPGA"), an application-specific integrated circuit ("ASIC"), a microprocessor, etc.

The processor 112*a* can be communicatively coupled to the memory 116*a* via the bus 114*a*. The memory 116*a* may include any type of memory device that retains stored information when powered off. Non-limiting examples of the memory 116a include electrically erasable and programmable read-only memory ("EEPROM"), flash memory, or any other type of non-volatile memory. In some examples, at least some of the memory 116a includes a computer-readable medium from which the processor 112a can read instructions 118a. The computer-readable medium can include electronic, optical, magnetic, or other storage devices capable of providing the processor 112a with computer-readable instructions or other program code. Non-limiting examples of a computer readable-medium include (but are not limited to) magnetic disks, memory chips, ROM, random-access memory ("RAM"), an ASIC, a configured processor, optical storage, or any other medium from which a computer processor can read instructions. The instructions 118a can include processor-specific instructions generated by a compiler or an interpreter from code written in any suitable computer-programming language, including, for example, C, C++, C #, etc.

The user device 102a can include input/output interface components (e.g., a display device 120a and a communication device 122a). The user device 102a can also include other input/output interface components such as, for example, a keyboard, a touch-sensitive surface, a mouse, and additional storage. In some examples, the user device 102a includes input/output interface components that may be used to facilitate wired or wireless connection to devices such as one or more display devices 120a, game controllers, keyboards, mice, joysticks, cameras, buttons, speakers, microphones and/or other hardware used to input or output data.

The user device 102a can transmit or receive data via the communication device 122a. The communication device 122a can represent one or more components that facilitate a network connection. In some examples, the communication device 122a is wireless and includes wireless interfaces such as IEEE 802.11, Bluetooth, or radio interfaces for accessing cellular telephone networks (e.g., transceiver/antenna for accessing a CDMA, GSM, UMTS, or other mobile communications network). In another example, the communication device 122a is wired and includes interfaces such as Ethernet, USB, IEEE 1394, or a fiber optic interface. The user device 102a can transmit or receive data (e.g., transmit data on a telecommunication network or transmit data to the server 104, the database 106, or another device in the environment 100) via the communication device 122a. In another example, the user device 102a transmits data to a remote location (e.g., to another computing device outside the environment 100 or a remotely located server or device) via the communication device 122a. In the example depicted in FIG. 1, the user device 102a transmits and receives data via a wireless interface. In other examples, the user device 102a transmits and receives data via a wired interface.

The user device 102a can include one or more sensors 124a that can capture information about an environment in which the user device 102a is located. The sensor 124a can include, for example, a global positioning system (GPS) unit, a range sensor, a Bluetooth device, a camera, an infrared sensor, a quick response (QR) code sensor, etc. In some examples, the sensor 124a is any device for detecting an eye gaze, line-of-sight, or field-of-view of a person (e.g., a person other than a user of the user device 102a). As an example, the sensor 124a includes a camera or is incorporated into the camera. The sensor 124a can detect a direction of the person's field-of-view with respect to content (e.g., texts images, sounds, videos, characters, virtual objects, virtual animations, etc.) displayed on display device 120a.

For example, the sensor 124a captures an image of an eye of a person other than the user of the user device 102a. The sensor 124a can then transmit a signal indicating the captured image to the processor 112a and the processor 112a can determine the direction of the field-of-view of the person relative to content on the display device 120a by using image processing. In another example, the sensor 124a monitors movements of an eye of the other person or muscles near the eye of the other person and transmit signals indicating the monitored movements to the processor 112a. The processor 112a can then determine the direction of the person's field-of-view relative to content on the display device 120a based on the monitored movements. In still another example, the sensor 124a monitors or measures electrical activity of muscles moving an eye of the other person and the processor 112a can determine the direction of the person's field-of-view relative to content on the display device 120a.

In some examples, the sensor 124a detects an eye gaze, line-of-sight, or field-of-view of a person other than the user of the user device 102a through various methods and techniques including, for example, by analyzing the person's body or head posture.

The sensor 124a can additionally, or alternatively, detect a location of another device (not shown), a presence of the other device, or proximity of the other device to the user device 102a via various techniques or methods. For example, the sensor 124a can detect another device and transmit a signal about the other device to the processor 112a. The processor 112a can then determine a location of the other device or a proximity of the other device to the user device 102a. In another example, the sensor 124a is a Bluetooth device or other network device that detects a location of another Bluetooth device by analyzing the strength of a signal between the sensor 124a and the other Bluetooth device or network device. In some examples, the sensor 124a detects a distance between the sensor 124a or the user device 102a and another computing device (e.g., based on the strength of the Bluetooth signal between the sensor 124a and the other computing device).

The sensor 124a can also detect a location or proximity of another device that includes a camera or sensor that may view or capture content on the display device 120a. The sensor 124a can then transmit a signal to the processor 112a and the processor 112a can determine whether the camera or sensor of the other device is directed at or toward the display device 120a. For example, the sensor 124a captures an image of the other device and transmits a signal indicating the captured image to the processor 112a and the processor 112a determines the direction of the field-of-view of the camera or sensor of the other device relative to content on the display device 120a using various image processing methods and techniques.

The processor 112a may be communicatively coupled to a single sensor 124a, and in other examples, processor 112a may be in communication with various sensors 124a, for example, a camera and a Bluetooth device. While in the examples described above, the sensor 124a can be separate from the processor 112a and transmit one or more signals to the processor 112a, in some examples, the sensor 124a can include the processor 112a and the processor 112a can receive or obtain data from the sensor 124a and analyze the data.

The memory 116a can include one or more modules for protecting content based on a detected field-of-view. For example, the memory 116a includes a content provision module 128a. The content provision module 128a can include one or more instructions stored on a computer-readable storage medium (e.g., the memory 116a) and executable by the processor 112a. When executed by the processor 112a, the computer-executable instructions can cause the processor 112a to provide content to a user (e.g., to a user of the user device 102a or another user) via the display device 120a. The content provided via the display device 120a can include public content or confidential content. Public content can include, for example, content intended to be viewed by the user of the user device 102a that may also be viewed by a person other than the user of the user device 102a or by another device (e.g., a time of day, a current date, etc.). Confidential or sensitive content can include content provided on the display device 120a that is not intended to be viewed by any person other than the user of the user device 102a. Examples of confidential content include, but are not limited to, bank account information, identification information, etc.

The memory 116a also includes a detection module 130a that can include instructions executable by the processor 112a to cause the processor 112a to determine a direction of an eye gaze or field-of-view of a person other than a user of the user device 102a through various methods and techniques. In some examples, the detection module 130a determines the direction of the eye gaze or field-of-view based on sensor signals received from sensor 124a. For example, the detection module 130a is electrically or communicatively coupled to the sensor 124a and receives data from the sensor 124a indicating an image of an eye of the person, movements of an eye of the person, movements of muscles near an eye of the person, electrical activity of muscles moving an eye of a person, the person's body or head posture, or any other data detected by the sensor 124a. The detection module 130a can then cause the processor 112a to determine a direction of an eye gaze or field-of-view of the person other than a user of the user device 102a based on the data received from the sensor 124a. The detection module 130a can also determine the direction of the eye gaze or field-of-view of the other person relative to the display device 120a. As an example, the detection module 130a receives or obtains data from the sensor 124a and determines whether the other person is looking at or toward the display device 120a (e.g., looking at or toward content displayed on the display device 120a).

The detection module 130a can additionally, or alternatively, cause the processor 112a to determine a location of another device (not shown) or proximity of the device to the user device 102a. The detection module 130a can determine the location or proximity of the other device based on sensor signals received from the sensor 124a. For example, the detection module 130a obtains or receives data about another device from the sensor 124a and causes the processor 112a to determine the location of the other device or the proximity of the other device to the user device 102a based on the data received from the sensor 124a. As an example, the sensor 124a is a Bluetooth device or other network device that detects another Bluetooth device and the detection module 130a causes the processor 112a to determine a location of the other Bluetooth device by analyzing the strength of a signal between the sensor 124a and the other Bluetooth device. In another example, the detection module 130a causes the processor to determine a location of another device or proximity of the device to the user device 102a via any suitable technique or method.

In some examples, the detection module 130a determines a location or proximity of another device that includes a camera or sensor that may view or capture content on the display device 120a of the user device 102a. The detection module 130a can determine the location or proximity of the other device based on sensor signals received or obtained from the sensor 124a. As an example, the detection module 130a obtains data indicating a presence, position, location, or attribute of the other device from the sensor 124a and obtains data indicating whether the device includes a camera or sensor that may view or capture content on the display device 120a. The detection module 130a can then cause the processor 112a to determine whether the camera or sensor of the other device is directed at or toward the display device 120a. As an example, the sensor 124a captures an image of the other device and transmits a signal indicating the captured image to the processor 112a and the processor 112a determines the direction of the field-of-view of a camera or sensor of the other device relative to content on the display device 120a based on the image by using various image processing methods and techniques.

The memory 116a also includes a content identification module 132a, which can be electrically or communicatively coupled to the content provision module 128a. The content identification module 132a can identify or determine confidential or public content provided by the content provision module 128a and displayed via the display device 120a. For example, the content provision module 128a causes the processor 112a to provide content via the display device 120a. The content can include public content (e.g., a current date) and confidential content (e.g., a bank account number associated with the user of the user device 102a). The content identification module 132a can then identify the confidential content or the public content being displayed on the display device 120a.

The memory 116a also includes a content protection module 134a that can protect content displayed via the display device 120a. The content protection module 134a can be electrically or communicatively coupled to the content identification module 132a and can receive or obtain data indicating that confidential content is being displayed via the display device 120a. The content protection module 134a can also be electrically or communicatively coupled to the detection module and can receive or obtain data indicating that an eye gaze or field-of-view of a person other than a user of the user device 102a is directed at or toward content on the display device 120a. The content protection module 134a can cause the processor 112a to hide the confidential content from view by the other person to protect the confidential content from the other person. As an example, the processor 112a transmits a signal to the content provision module 128a or the display device 120a to cause the display device 120a to hide or blur at least a portion of the confidential content (e.g., hide or blur a portion of a bank account number displayed via the display device 120a).

The content protection module 134a can also unprotect or reveal content for view on the display device 120a. For example, the content protection module 134a obtains or receives data from the sensor 124a indicating an image of an eye of the other person, movements of an eye of the other person, movements of muscles near an eye of the other person, electrical activity of muscles moving an eye of the other person, the other person's body or head posture, or any other data detected by the sensor 124a. The content protection module 134a can then determine that the eye gaze or field-of-view of the other person is no longer directed at or toward the display device 120a (e.g., directed away from the display device 120a) based on the obtained or received data. In this example, the content protection module 134a causes the processor 112a to transmit a signal to the content provision module 128a or the display device 120a to unhide or reveal the confidential content for view by the user of the user device 102a (e.g., reveal the previously hidden portion of the bank account number displayed on the display device 120a).

Figure 3:
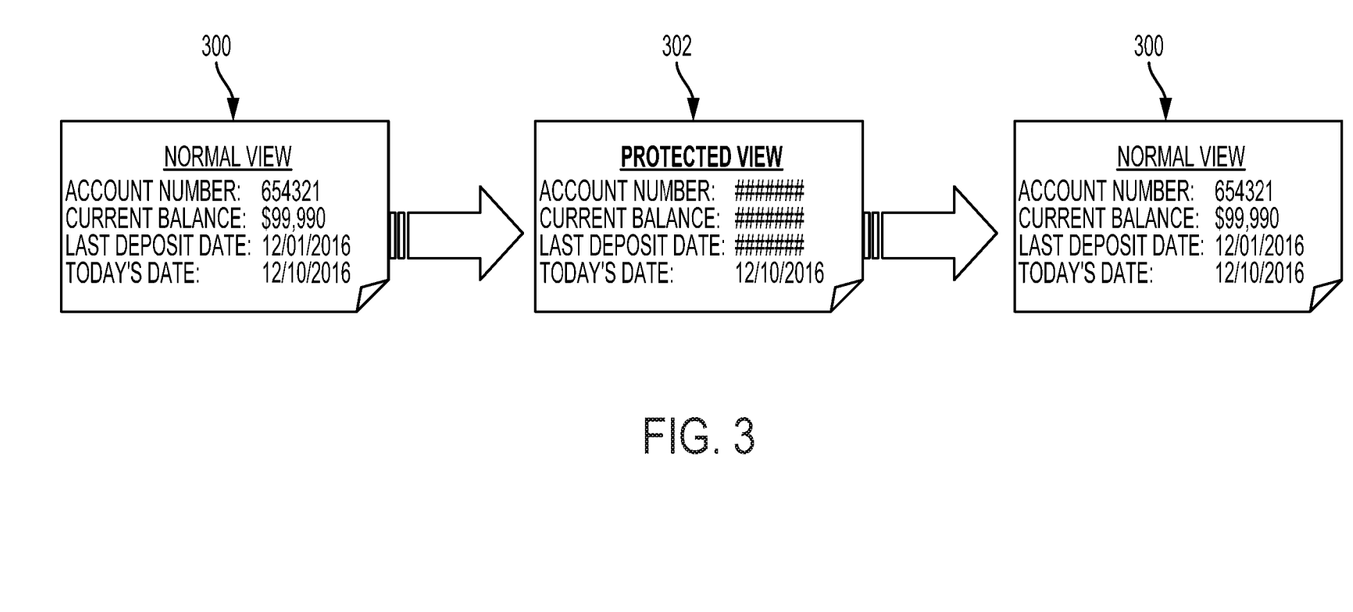
FIG. 3 is an example of a series of user interfaces that can be generated by the user device for protecting content based on a detected field-of-view according to some aspects.

FIG. 3 is an example of a series of user interfaces 300, 302 that can be generated by the user device 102a-c for protecting content based on a detected field-of-view according to some aspects. The user device 102a can generate a first user interface 300 for displaying content on the display device 120a. For example, the content provision module 128a of the user device 102a causes the user device 102a to display the user interface 300 via the display device 120a of the user device 102a. The user interface 300 includes public content, such as a current date, and confidential content, such as an account number, a current account balance, and a date of a last account deposit.

The user device 102a can also generate another user interface 302. For example, a content protection module 134a of the user device 102a can cause a processor 112a of the user device 102a to generate the user interface 302 to hide confidential content on the display device 120a from view to protect the confidential content. For example, the processor 112a transmits a signal to the content provision module 128a or the display device 120a to generate the interface 302 and cause the account number, current account balance, and the date of a last account deposit to be hidden from view.

As described above, the content protection module 134a can unprotect or reveal content for view on the display device 120a. For example, the content protection module 134a causes the processor 112a to transmit a signal to the content provision module 128a or the display device 120a to generate and output the user interface 300 to unhide or reveal the confidential content for view by the user of the user device 102a. In this example, the display device 120a can unhide the account number, current account balance, and the date of a last account deposit previously hidden from view in the user interface 302.

Returning to FIG. 1, in some examples, the content protection module 134a receives or obtains data from the content identification module 132a that indicates that confidential content is being displayed via the display device 120a. The content protection module 134a can also receive or obtain data from the detection module 130a that indicates that a direction of a field-of-view of another device is directed at or toward the display device 120a and the content protection module 134a can cause the processor 112a to hide confidential content from view by the other device to protect the confidential content. The content protection module 134a can also unprotect or reveal the confidential content in response to determining that the direction of the field-of-view of the other device is no longer directed at or toward the display device 120a.

In some examples, the content protection module 134a determines an amount of the confidential content to hide or a duration of time to hide the confidential content based on the detected field-of-view of the other person or the other device. As an example, the content protection module 134a causes the processor 112a to hide all or substantially all of the confidential content in response to determining that the direction of the field-of-view of the other person or the other device is directed at or toward the display device 120a. As another example, the content protection module 134a causes the processor 112a to hide the confidential content for a duration of time (e.g., two seconds, five seconds, or any suitable duration of time) in response to determining that the direction of the field-of-view of the other person or other device is directed at or toward the display device 120a.

The server 104 can be electrically or communicatively coupled to the user devices 102a-c and can receive or obtain data from the user devices 102a-c. For example, the server 104 includes a communication device 107 that can be configured in substantially the same manner as the communication device 122a-c. The server 104 can also include a processor 136, a bus 138, and a memory 140, each of which can be configured in substantially the same manner as the processor 112a-c, the bus 114a-c, and the memory 116a-c, although they need not be. The server 104 can store data obtained or received from the user devices 102a-c (e.g., via the communication device 107) in the database 106.

The user devices 102a-c can transmit data about an attribute of the user devices 102a-c to the server 104. As an example, the user device 102a transmits data indicating a location of the user device 102a, a type of the user device 102a (e.g., a laptop or a smartwatch or a size of the user device 102a), an application or program being executed by the processor 112a of the user device 102a, a type of network connection associated with the user device 102a, or any other data associated with the user device 102a. For example, the user device 102a includes a global positioning system ("GPS") for providing data indicating a location of the user device 102a and the user device 102a transmits data indicating the location to the server 104. As another example, the user device 102a is connected to a wireless network and the user device 102a transmits data associated with the wireless network to the server 104. In some examples, the user devices 102a-c can transmit data associated with the user devices 102a-c in response to determining that an eye gaze or field-of-view of a person other than a user of the user device 102a-c is directed at or toward content on the display device 120a-c.

The memory 140 of the server 104 can include one or more instructions stored on a computer-readable storage medium (e.g., the memory 140) and executable by the processor 136. When executed by the processor 136, the computer-executable instructions can cause the processor 136 to perform one or more operations. For example, the memory 140 includes a machine-learning algorithm module 108 that receives or obtains data about an attribute of the user devices 102a-c. The machine-learning algorithm module 108 can then train a machine-learning algorithm based on the data obtained or received from the user devices 102a-c. For example, the machine-learning algorithm module 108 receives data indicating a location of the user device, a type of the user device 102a-c, an application or program executed using the user device 102a-c, or a type of network connection associated with the user device 102a-c when the user device 102a-c determines that an eye gaze or field-of-view of a person other than a user of the user device 102a-c is directed at or toward content on the display device 120a-c. The machine-learning algorithm module 108 can then train the machine-learning algorithm based on the data. A machine-learning algorithm can be a machine-learning model that uses statistical learning algorithms that are used to estimate or approximate functions that depend on a large number of inputs in a non-linear, distributed, and parallel manner. An example of a machine-learning algorithm includes, but is not limited to, a neural network. A computer learning machine-learning algorithm can include an interconnected group of nodes, called neurons. A machine-learning algorithm can include input nodes, output nodes, and intermediary nodes. In some examples, the connections between each node are weighted with a set of adaptive weights that are tuned by a learning algorithm, and are capable of approximating non-linear functions of their inputs. The machine-learning algorithm module 108 can train the machine-learning algorithm to determine a risk profile associated with an attribute of the user device 102a-c. For example, the machine-learning algorithm module 108 includes a risk profile module 109 that determines various risk profiles associated with various attributes. A risk profile can indicate a likelihood or risk that content displayed on the user device 102a-c will be exposed to view by a person other than the user of the user device 102a-c. The machine-learning algorithm can use the risk profile module 109 to train the machine-learning algorithm to determine various risk profiles associated with various attributes of the user devices 102a-c based on the data obtained or received from the user devices 102a-c. In some examples, the server 104 stores the various risk profiles and the various attributes of the user devices 102a-c in the database 106.

For example, the machine-learning algorithm module 108 receives data indicating a location of the user device 102a when the user device 102a determines that an eye gaze or field-of-view of a person other than a user of the user device 102a is directed at or toward content on the display device 120a. The machine-learning algorithm module 108 can also receive data indicating a location of the user device 102b when the user device 102b determines that an eye gaze or field-of-view of a person other than a user of the user device 102b is directed at or toward content on the display device 120b. The machine-learning algorithm module 108 can then use the risk profile module 109 to train the machine-learning algorithm to determine a risk profile associated with the location of the user device 102a or the location of the user device 102b. As an example, the risk profile module 109 uses the machine-learning algorithm to compare the location of the user device 102a and the location of the user device 102b and determine a similarity or correspondence between the locations based on the comparison. The risk profile module 109 can then train the machine-learning algorithm to determine a risk profile associated with the locations of the user devices 102a-b based on the similarity or correspondence. For example, the risk profile module 109 trains the machine-learning algorithm to compare the locations of the user devices 102a-b and determine that the locations are the same or substantially the same. The risk profile module 109 can then train the machine-learning algorithm to determine that the locations of the user devices 102a-b are associated with a high risk-profile (e.g., that there is a high likelihood that content displayed on a computing device at that location will be viewed by a person other than the user of the computing device) in response to determine that the locations are the same or substantially the same.

In some examples, the machine-learning algorithm module 108 uses the risk profile module 109 to train the machine-learning algorithm to determine a risk profile associated with an attribute of a subsequent user device based on a determined risk profile. As an example, the risk profile module 109 obtains data indicating a location of the user device 102c and compares the location of the user device 102c and the location of user devices 102a-b. The risk profile module 109 can then use the machine-learning algorithm to determine that the location of the user device 102c is the same or substantially the same as the location of the user device 102a or 102b based on the comparison. The risk profile module 109 can then train the machine-learning algorithm to determine that the location of the user device 102c is associated with a high risk-profile. As another example, the risk profile module 109 trains the machine-learning algorithm to determine that the location of the user device 102c is associated with a low-risk profile in response to determining that the location of the user device 102c is not substantially the same as the location of the user device 102a or 102b.

The server 104 can use the machine-learning algorithm to determine various risk profiles associated with various attributes of the user devices 102a-c as described above and then use the communication device 107 to transmit one or more signals that indicate a determined risk profile to user device 102a-c. The user device 102a-c can then protect content displayed on the display device 120a-c in response to receiving the signal even if the user device 102a-c has not detected a field-of-view of another person or device. For example, the server 104 determines that the locations of the user devices 102a-b are associated with a high risk-profile. The server 104 then obtains data indicating the location of the user device 102c and determines that the location of the user device 102c is associated with a high risk-profile in response to determining that the location of the user device 102c is the same or substantially the same as the location of the user devices 102a-b. The server 104 can then transmit a signal to the user device 102c that indicates that the location of the user device 102c is associated with a high risk-profile and the content protection module 134c of the user device 102c can protect content displayed via the display device 120c even if the user device 102c has not detected a field-of-view of another person or camera. For example, the content protection module 134c obtains data indicating that confidential content is being displayed via the display device 120c and causes the processor 112c to hide a portion of the confidential content in response to receiving the signal from the server 104 indicating that the location of the user device 102c is associated with a high risk-profile.

The user device 102c can also determine an amount of confidential content to hide based on the signal received from the server 104. For example, the user device 102c receives a signal from the server 104 that indicates that a location of the user device 102c is associated with a high risk-profile. The user device 102c can then hide all or substantially all of the confidential content based on the received signal (e.g., hide all digits of a bank account number displayed on the display device 120c). As another example, the user device 102c receives a signal from the server 104 that indicates that a location of the user device 102c is associated with a low risk-profile and the user device 102c hides a portion of the confidential content (e.g., less than all of the confidential content displayed on the display device 120c).

The user device 102c can additionally or alternatively determine a duration of time to hide the confidential content based on the signal received from the server 104. As an example, the user device 102c receives a signal from the server 104 that indicates that the location of the user device 102c is associated with a high risk-profile and the user device 102c hides all or substantially all of the confidential content on the display device 120c for a duration of time (e.g., two seconds, five seconds, ten seconds, or any suitable duration of time) in response to receiving the signal. In some examples, the user device 102c hides confidential content for a longer duration of time when a signal from the server 104 indicates that the location of the user device 102c is associated with a high risk-profile as compared to when a signal indicates that the location of the user device 102c is associated with a low risk-profile.

While in this example, the server 104 obtains or receives data from the user device 102a-c when the user device 102a-c determines that an eye gaze or field-of-view of a person other than a user of the user device 102a-c is directed at or toward content on the display device 120a-c and determines various risk profiles associated with various attributes of the user device 102a-c based on the obtained or received data, the present disclosure is not limited to such configurations. Rather, in other examples, the server 104 obtains or receives data from the user device 102a-c when the user device 102a-c determines that a direction of a field-of-view of another device is directed at or toward the display device 120a-c. In such examples, the server 104 determines various risk profiles associated with various attributes of the user device 102a-c based on the obtained or received data and transmits one or more signals indicating a risk profile in substantially the same manner as described above.

Moreover, in some examples, the server 104 transmits other data to the user device 102a-c (e.g., one or more signals other than the risk profile or in addition to the risk profile) and the user device 102a-c can protect content displayed on the display device 120a-c in response to receiving the data even if the user device 102a-c has not detected a field-of-view of another person or device.

In still another example, the user devices 102a-c receives user input indicating a particular risk profile. As an example, the user device 102c receives user input indicating a low risk-profile based on an attribute (e.g., a location) of the user device 102c and the processor 112c of the user device 102c can determine an amount of confidential content to hide or a duration of time to hide the confidential content based on the received user input.

Although FIG. 1 illustrates a particular arrangement of the environment 100, various additional arrangements are possible. As an example, while FIG. 1 illustrates the user device 102a and the machine-learning algorithm module 108 as separate components, in some embodiments, the user device 102a and the machine-learning algorithm module 108 can be part of a single system.

Figure 2:
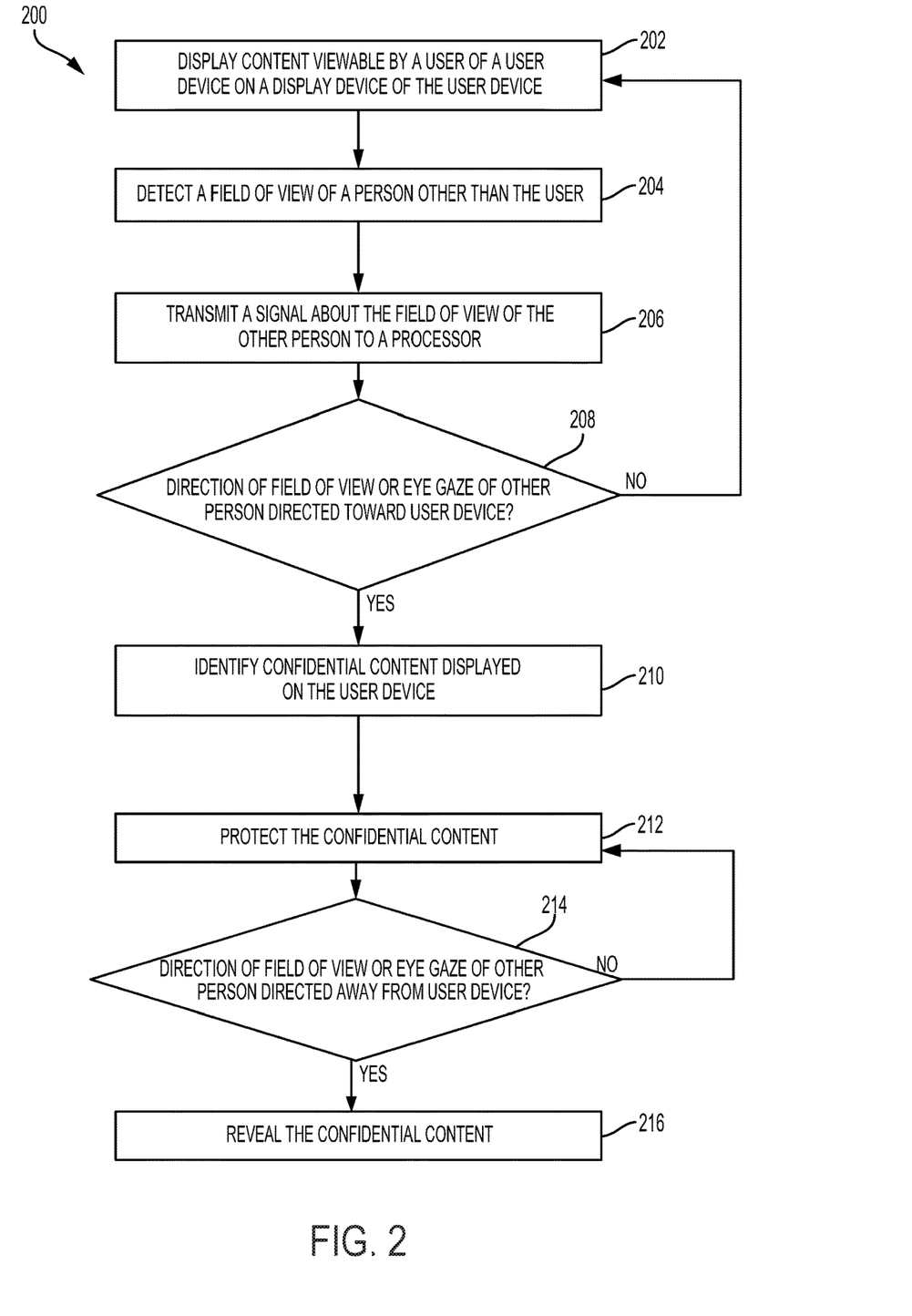
FIG. 2 is a flow chart depicting an example of a process for protecting content based on a detected field-of-view of a person according to some aspects.

FIG. 2 is a flow chart depicting an example of a process 200 for protecting content based on a detected field-of-view of a person according to some aspects. In some embodiments, the steps in FIG. 2 may be implemented in program code that is executable by a processor, for example, the processor in a general-purpose computer, a mobile device, or a server. In some embodiments, these steps may be implemented by a group of processors. In some embodiments, one or more steps shown in FIG. 2 may be omitted or performed in a different order. Similarly, in some embodiments, additional steps not shown in FIG. 2 may also be performed. The process 200 of FIG. 2 is described with reference to FIGS. 1 and 3, but other implementations are possible.

In block 202, content viewable by a user of a user device 102a is displayed on a display device 120a of the user device 102a. For example, the user device 102a includes a content provision module 128a that provides the content, which can include public content or confidential content. In some examples, the user device 102a generates an interface for displaying the content on the display device 120a. For example, the user device 102a generates the user interface 300 of FIG. 3, which can include public content such as, for example, a current date. The user interface 300 can also include confidential content such as, for example, an account number, a current account balance, and a date of a last account deposit.

In block 204, a sensor 124a detects a field-of-view of a person other than the user of the user device 102a. In some examples, the sensor 124a detects a field-of-view or a direction of an eye gaze of the other person relative to the display device 120a.

In block 206, a signal about the field-of-view of the other person is transmitted to a processor 112a of the user device 102a. In some examples, in block 206, a signal about the direction of the eye gaze of the other person can be transmitted to the processor 112a. In some examples, the sensor 124a transmits the signal about the field-of-view or the direction of the eye gaze of the other person to the processor 112a.

In block 208, a direction of an eye gaze or field-of-view of the other person relative to the user device 102a is determined. For example, the user device 102a includes a detection module 130a that determines the direction of an eye gaze or field-of-view of the other person based on a sensor signal received from sensor 124a. In some examples, the detection module 130a determines the direction of the eye gaze or field-of-view of the person relative to the display device 120a of the user device 102a. As an example, the detection module 130a determines whether the other person is looking at or toward the display device 120a (e.g., looking at or toward content displayed on the display device 120a). If the other person is not looking at or toward the display device 120a, content viewable by the user of a user device 102a can continue to be displayed on the display device 120a (e.g., at block 202).

If the other person is looking at or toward the display device 120a, the process 200 further includes, in block 210, identifying confidential content displayed on the user device 102a. In some examples, the user device 102a includes a content identification module 132a that causes the processor 112a to identify or determine confidential or public content displayed via the display device 120a (e.g., in block 202). For example, the processor 112a identifies the current date displayed in the user interface 300 of FIG. 3 as public content and identifies the account number, current account balance, and the date of the last account deposit displayed in the user interface 300 as confidential content.

In block 212, the confidential content is protected based on the direction of the field-of-view or the eye gaze of the other person. For example, the user device 102a includes a content protection module 134a that protects content displayed via the display device 120a. The content protection module 134a can receive or obtain data from the content identification module 132a that indicates confidential content displayed via the display device 120a. As an example, the content protection module 134a receives data indicating that the account number, current account balance, and the date of a last account deposit displayed in the user interface 300 of FIG. 3 is confidential content. The content protection module 134a can also receive or obtain data from the detection module 130a that indicates that an eye gaze or field-of-view of a person other than a user of the user device 102a is directed at or toward content on the display device 120a. The content protection module 134a can then cause the processor 112a to hide the confidential content from view by the other person to protect the confidential content (e.g., by causing the user device 102a to generate the user interface 302 of FIG. 3 to hide or protect the confidential content).

In block 214, the content protection module 134a determines whether the eye gaze or field-of-view of the other person is directed away from the user device 102a. If the other person is still looking at or toward the user device 102a, confidential content can continue to be protected from view by the other person (e.g., at block 212). If the other person is no longer looking at or toward the user device 102a, the process 200 further includes, in block 216, revealing or unprotecting the confidential content.

In block 216, the confidential content is revealed or unprotected based on the direction of the field-of-view or eye gaze of the other person. For example, the content protection module 134a determines that the eye gaze or field-of-view of the other person is no longer directed at or toward the display device 120a and causes the processor 112a to transmit a signal to the display device 120a or the content provision module 128a to unhide or reveal the confidential content for view by the user of the user device 102a. As an example, the content protection module 134a causes the processor 112a to output the user interface 300 of FIG. 3 that includes the public and confidential content in response to determining that the eye gaze or field-of-view of the other person is no longer directed at or toward the display device 120a.

Figure 4:
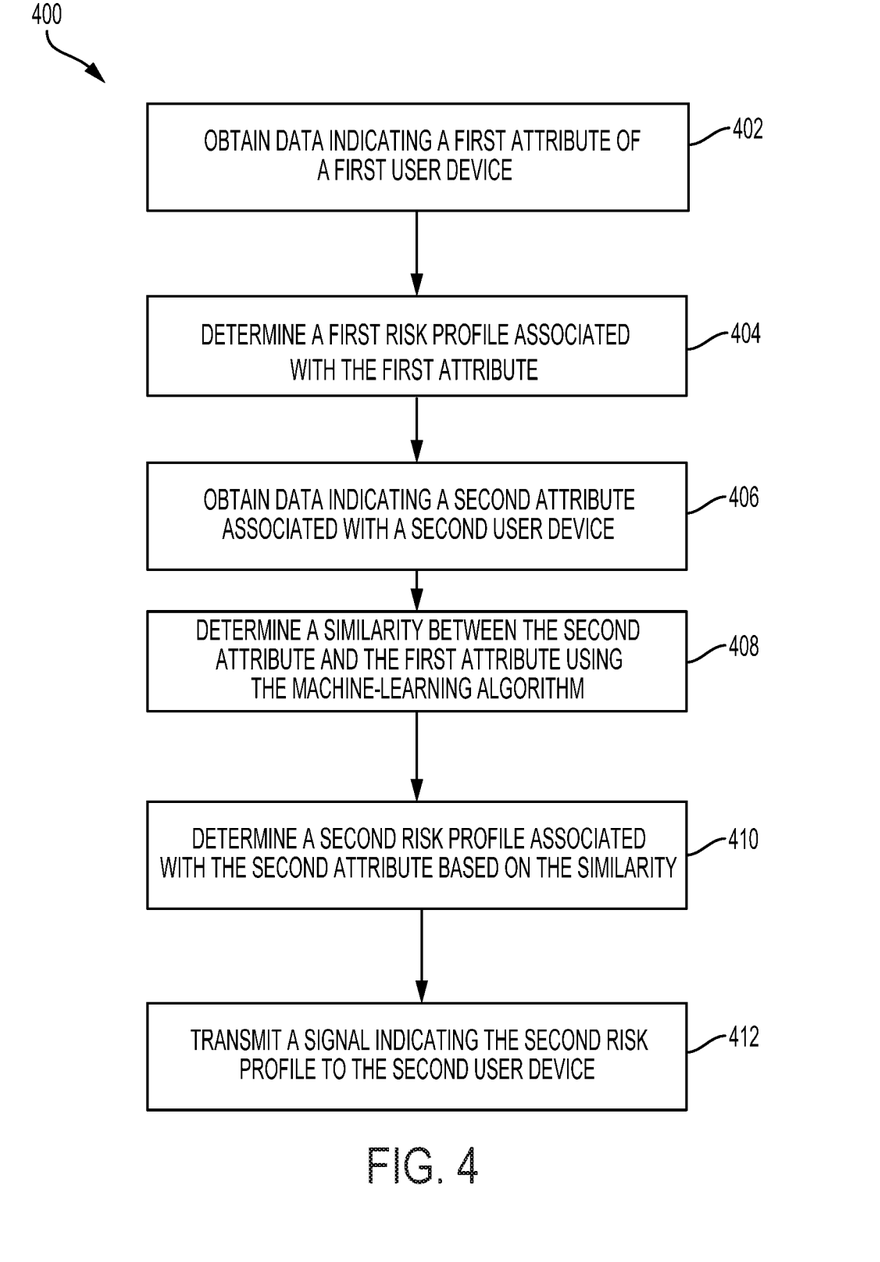
FIG. 4 is a flow chart depicting another example of a process for protecting content from a field-of-view of a person or other device according to some aspects.

FIG. 4 is a flow chart depicting another example of a process 400 for protecting content from a field-of-view of a person or other device according to some aspects. In some embodiments, the steps in FIG. 4 may be implemented in program code that is executable by a processor, for example, the processor in a general-purpose computer, a mobile device, or a server. In some embodiments, these steps may be implemented by a group of processors. In some embodiments, one or more steps shown in FIG. 4 may be omitted or performed in a different order. Similarly, in some embodiments, additional steps not shown in FIG. 4 may also be performed. The process 400 of FIG. 4 is described with reference to the environment 100 of FIG. 1, but other implementations are possible.

In block 402, a server 104 obtains data indicating a first attribute of a first user device 102a. As an example, the user device 102a transmits data indicating a location of the user device 102a, a type of the user device 102a (e.g., a size, shape, configuration, etc.), an application or program executed by a processor 112a of the user device 102a, a type of network connection associated with the user device 102a, or any other data associated with the user device 102a. In some examples, the user device 102a transmits data indicating an attribute of the user device 102a to the server 104 in response to determining that an eye gaze or field-of-view of a person other than a user of the user device 102a is directed at or toward content on a display device 120a of the user device 102a (e.g., in block 208 of FIG. 2).

In block 404, a risk profile associated with the first attribute of the user device 102a is determined. In some examples, the server 104 determines the risk profile associated with the first attribute of the user device 102a. The server 104 can determine the risk profile by training a machine-learning algorithm to determine the risk profile. In some examples, the server 104 includes a machine-learning algorithm module 108 that receives or obtains data from various user devices 102a-c. The machine-learning algorithm module 108 can include a risk profile module 109 and the risk profile module 109 can train the machine-learning algorithm to determine various risk profiles associated with various attributes of the user device 102a-c based on the data obtained or received from the user device 102a-c.

For example, the machine-learning algorithm module 108 receives data indicating a wireless network that the user device 102a is connected to when the user device 102a determines that an eye gaze or field-of-view of a person other than a user of the user device 102a is directed at or toward content on the display device 120a (e.g., in block 402). The machine-learning algorithm module 108 can also receive data indicating a wireless network that the user device 102b is connected to when the user device 102b determines that an eye gaze or field-of-view of a person other than a user of the user device 102b is directed at or toward content on the display device 120b. The machine-learning algorithm module 108 can then use the risk profile module 109 to train the machine-learning algorithm to determine a risk profile associated with the wireless network to which the user device 102a is connected. As an example, the machine-learning algorithm module 108 uses the risk profile module 109 to train the machine-learning algorithm to compare the wireless networks that the user devices 102a-b are connected to and determine that the wireless networks are the same or substantially the same. The risk profile module 109 can then train the machine-learning algorithm to determine that the wireless network that the user device 102a is connected to is associated with a high risk-profile (e.g., that there is a high risk that content displayed on a user device connected to that wireless network will be viewed by a person other than the user of the user device).

In block 406, the server 104 obtains data indicating a second attribute of a second user device 102c. For example, the server 104 obtains data indicating a second attribute of the user device 102c including, for example, a location of the user device 102c, a type of the user device 102c, an application or program executed by a processor 112c of the user device 102c, a type of network connection associated with the user device 102c, or any other data about the user device 102c.

In block 408, the server 104 determines a similarity between the second attribute of the second user device 102c and the first attribute of the first user device 102a using the machine-learning algorithm. For example, the machine-learning algorithm module 108 obtains data indicating a wireless network that the user device 102c is connected to (e.g., in block 406) and data indicating a wireless network that the user device 102a is connected to (e.g., in block 402). The risk profile module 109 then uses the machine-learning algorithm to compare the wireless networks to determine a similarity or correspondence based on the comparison. For example, the risk profile module 109 determines that the wireless network that the user device 102a is connected to is the same or substantially the same as the wireless network to which the user device 102c is connected.

In block 410, the server 104 uses the machine-learning algorithm to determine a second risk profile associated with the second attribute of the user device 102c based on the similarity between the second attribute of the second user device 102c and the first attribute of the first user device 102a. For example, the risk profile module 109 uses the machine-learning algorithm to determine that the user devices 102a and 102c are connected to the same wireless network (e.g., in block 408). The risk profile module 109 can then use the machine-learning algorithm to determine that the wireless network that the user device 102c is connected to is associated with a high risk-profile. As another example, the risk profile module 109 uses the machine-learning algorithm to determine that user devices 102a and 102c are not connected to the same wireless network and uses the machine-learning algorithm to determine that the wireless network that the user device 102c is connected to is not associated with a high risk-profile (e.g., the network is associated with a low risk-profile).

In block 412, a signal indicating the second risk profile is transmitted to the second user device 102c. In some examples, the server 104 transmits the signal to the user device 102c. For example, as described above, the machine-learning algorithm module 108 uses the machine-learning algorithm to determine that the user devices 102a and 102c are connected to the same wireless network and that the wireless network that the user device 102c is connected to is associated with a high risk-profile. The server 104 can then transmit a signal to the user device 102c that indicates that the wireless network that the user device 102c is connected to is associated with a high risk-profile and the content protection module 134c of the user device 102c can protect content displayed via the display device 120c in response to receiving the signal. In some examples, the user device 102c determines an amount of confidential content to hide or a duration of time to hide the confidential content based on the signal received from the server 104.

In this manner, the server 104 can obtain data from various user devices 102a-c and use the obtained data to train a machine-learning algorithm to determine various risk profiles associated with various attributes of the user devices 102a-c. The server 104 can then transmit one or more signals indicating the various risk profiles to the user devices 102a-c and the user devices 102a-c can protect certain content displayed on the display devices 120a-c from view by a person other than the user of the user device 102a-c based on the received signal.

While in this example, the server 104 obtains or receives data from the user device 102a-c when the user device 102a-c determines that an eye gaze or field-of-view of a person other than a user of the user device 102a-c is directed at or toward content on the display device 120a-c and determines various risk profiles associated with various attributes of the user device 102a-c based on the obtained or received data, the present disclosure is not limited to such configurations. Rather, in other examples, the server 104 obtains or receives data from the user device 102a-c when the user device 102a-c determines that a direction of a field-of-view of another device is directed at or toward the display device 120a-c. In such examples, the server 104 determines various risk profiles associated with various attributes of the user device 102a-c based on the obtained or received data and transmits one or more signals indicating a risk profile in substantially the same manner as described above. Moreover, in some examples, the server 104 transmits one or more signals or any other data to the user devices 102a-c and the user devices 102a-c can hide confidential content in response to receiving the signal or data.

Figure 5:
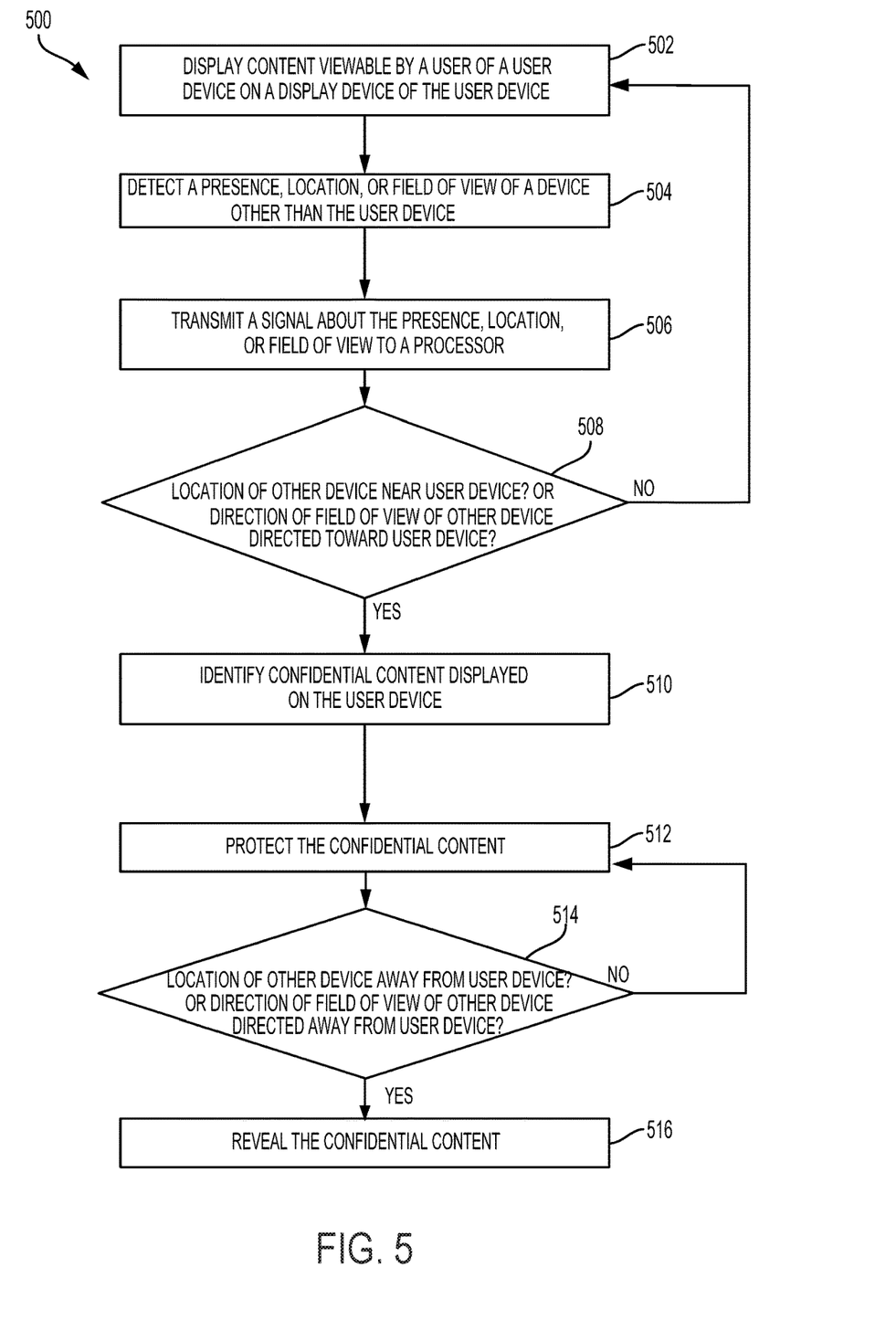
FIG. 5 is a flow chart depicting an example of a process for protecting content based on a detected field-of-view of a device according to some aspects.

FIG. 5 is a flow chart depicting an example of a process 500 for protecting content based on a detected field-of-view of a device according to some aspects. In some examples, the steps in FIG. 5 may be implemented in program code that is executable by a processor, for example, the processor in a general-purpose computer, a mobile device, or a server. In some embodiments, these steps may be implemented by a group of processors. In some embodiments, one or more steps shown in FIG. 5 may be omitted or performed in a different order. Similarly, in some embodiments, additional steps not shown in FIG. 5 may also be performed. The process 500 of FIG. 5 is described with reference to the environment 100 of FIG. 1, but other implementations are possible.

In block 502, content viewable by a user of a user device 102a is displayed on a display device 120a of the user device 102a. In some examples, the content can be displayed in substantially the same manner as described above with respect to block 202 of FIG. 2.

In block 504, a sensor 124a detects a presence, location, or field-of-view of a device other than the user device 102a. The device can be any device that may include a camera, sensor, or other component that can capture or view content on the display device 120a of the user device 102a. For example, the device can include a mobile device, a smart-phone, a laptop, tablet, e-reader, smartwatch, etc.

In some examples, the sensor 124a can detect a presence, location, proximity, or field-of-view of the other device relative to the user device 102a or the display device 120a via any suitable technique or method. As an example, the sensor 124a can include a Bluetooth device or other network device that can detect a presence, location, or proximity of another Bluetooth device or another network device by analyzing the strength of a signal between the sensor 124a and the other Bluetooth device or network device. As another example, the sensor 124a can capture an image of the other device and the captured image can be used to determine a presence, location, proximity, or field-of-view of the other device relative to the user device 102a or the display device 120a.

In block 506, a signal about the presence, location, or field-of-view of the other device is transmitted to a processor 112a. In some examples, the sensor 124a transmits the signal about the presence, location, or field-of-view of the device to the processor 112a.

In block 508, the location or a direction of a field-of-view of the other device relative to the user device 102a is determined. For example, the user device 102a includes a detection module 130a that causes the processor 112a to determine the presence, location, proximity, or field-of-view of the other device. In some examples, the detection module 130a causes the processor 112a to determine the presence, location, proximity, or field-of-view of the other device based on a sensor signal received from the sensor 124a (e.g., a sensor signal transmitted in block 506).

For example, the sensor 124a is a Bluetooth device or other network device that can detect a location of another Bluetooth device and the detection module 130a can cause the processor 112a to determine a location of the other Bluetooth device or proximity of the other Bluetooth device by analyzing the strength of a signal between the sensor 124a and the other Bluetooth device. As another example, the sensor 124a captures an image of the other device and then transmits a signal indicating the captured image to the processor 112a and the processor 112a determines the direction of the field-of-view of a camera or sensor of the other device relative to content on the display device 120a based on the image by using various image processing methods and techniques. For example, the processor 112a determines whether the direction of the field-of-view of the camera or sensor of the other device is directed at or toward the display device 120a. If the other device is not near the user device 102a or if the camera or sensor of the other device is not directed at or toward the display device 120a, content viewable by the user of a user device 102a can continue to be displayed on the display device 120a (e.g., at block 502).

If the other device is near the user device 102a or if the camera or sensor of the other device is directed at or toward the display device 120a, the process 500 further includes, in block 510, identifying confidential content displayed on the user device 102a. In some examples, a content identification module 132a can identify the confidential content in substantially the same manner as described above with respect to block 210 of FIG. 2.

In block 512, the confidential content is protected based on the location or the direction of the field-of-view of the other device. For example, the user device 102a includes a content protection module 134a that protects content displayed via the display device 120a. The content protection module 134a can obtain or receive data from the content identification module that indicates confidential content displayed via the display device 120a. The content protection module 134a can also receive or obtain data from the detection module 130a that indicates that a direction of a field-of-view of the other device is directed at or toward the display device 120a. The content protection module 134a can then cause the processor 112a to hide confidential content from view by the other device to protect the confidential content. In some examples, the content protection module 134a receives or obtains data indicating that a location or proximity of the other device is near the location of the user device 102a and the content protection module 134a causes the processor 112a to hide confidential content from view by the other device.

In block 514, the content protection module 134a determines if the other device is located away from the user device 102a or if the camera or sensor of the other device is directed away from the user device 102a. If the other device is still located near the user device 102a or if the camera or sensor of the other device is still directed toward the user device 102a, confidential content can continue to be protected from view by the other device (e.g., at block 512). If the other device is located away from the user device 102a or if the direction of the field of view of the camera or sensor of the other device is no longer directed at or toward the user device 102a, the process 500 further includes, in block 516, revealing or unprotecting the confidential content.

In block 516, the confidential content is revealed or unprotected based on the location or direction of field-of-view of the other device. For example, the content protection module 134a determines that the direction of the field-of-view of the other device is no longer directed at or toward the display device 120a and causes the processor 112a to transmit a signal to the content provision module 128a or the display device 120a to unhide or reveal the confidential content for view by the user of the user device 102a. In some examples, the content protection module 134a can reveal or unprotect the confidential content based on the location or the direction of the field-of-view of the other device in substantially the same manner as described above with respect to block 216 of FIG. 2.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A server comprising:
a processing device;
a communication device configured for transmitting or receiving data via a network; and
a non-transitory computer-readable medium communicatively coupled to the processing device, the non-transitory computer-readable medium comprising instructions that are executable by the processing device for:
receiving data about attributes from user devices with sensors for capturing information about environments in which the user devices are located;
determining a plurality of risk profiles using the attributes, the plurality of risk profiles indicating likelihoods of content on the user devices being viewed by persons other than users of the user devices, each risk profile of the plurality of risk profiles associated with at least one of a particular location, a particular application or program, a particular type of computing device, or a particular type of network; and
transmitting, to a first user device and using the communication device, data indicating a risk profile of the plurality of risk profiles, the risk profile being usable by the first user device for identifying confidential content displayed on the first user device and protecting the confidential content.

2. The server of claim 1, wherein the processing device of the server is further configured to:
receive data indicating a first attribute of the first user device;
receive data indicating a second attribute of a second user device;
determine a similarity between the first attribute of the first user device and the second attribute of the second user device based on a comparison of the first attribute and the second attribute;
determine another risk profile associated with the second attribute of the second user device based on the similarity; and
transmit, to the second user device and using the communication device, data indicating the other risk profile, the other risk profile being usable by the second user device for identifying confidential content displayed on the second user device and protecting the confidential content.

3. The server of claim 1, wherein an attribute comprises at least one of a location of a user device, a type of the user device, an application or program executed by the user device, or a type of network connection associated with the user device.

4. The server of claim 1, wherein the first user device comprises:
a display device;
a first processing device; and
a first non-transitory computer-readable medium communicatively coupled to the first processing device, wherein the first processing device is configured to perform operations comprising:
displaying, via the display device, content comprising public content and confidential content;
receiving, from the server, data indicating the risk profile;
identifying the confidential content displayed via the display device in response to receiving the risk profile; and
hiding or blurring at least a portion of the confidential content in response to receiving the risk profile to protect the confidential content from view.

5. The server of claim 1, wherein the processing device of the server is further configured to transmit the data indicating the risk profile to the first user device to cause the first user device to determine an amount of the confidential content to protect based on the risk profile.

6. The server of claim 1, wherein the processing device of the server is further configured to transmit the data indicating the risk profile to the first user device to cause the first user device to determine a duration of time to protect the confidential content based on the risk profile.

7. The server of claim 1, wherein the processing device of the server is further configured to determine the plurality of risk profiles by training a machine-learning algorithm to determine the plurality of risk profiles using the attributes received from the user devices.

8. A user device comprising:
a display device;
a communication device configured for transmitting or receiving data via a network;
a sensor device configured for capturing information about a field of view of a third-party device or a person other than a user of the user device;
a processing device; and
a non-transitory computer-readable medium communicatively coupled to the processing device, the non-transitory computer-readable medium comprising instructions that are executable by the processing device for:
displaying, via the display device, content comprising public content and confidential content;
receiving data from a server through the communication device, the data indicating a risk profile from a plurality of risk profiles indicating likelihoods of content being viewed by persons or third-party devices other than users of user devices, each risk profile of the plurality of risk profiles associated with at least one of a particular location, a particular application or program, a particular type of computing device, or a particular type of network;
receiving, from the sensor device, captured information about the field of view of the third-party device or the person other than the user of the user device;
identifying the confidential content displayed via the display device;
using the data received from the server and the captured information to determine to protect the confidential content; and
in response to determining to protect the confidential content, protecting the confidential content from view by the third-party device or the person other than the user of the user device at least in part by determining a direction of the field of view of the third party device or the person other than the user of the user device.

9. The user device of claim 8, wherein the processing device is further configured to determine an amount of the confidential content to protect or a duration of time to protect the confidential content.

10. The user device of claim 8, wherein the processing device is further configured to:
transmit, to the server and using the communication device, data indicating an attribute of the user device; and
receive data from the server based on the attribute, the attribute comprising at least one of a location of the user device, a type of the user device, an application or program executed by the user device, or a type of network connection associated with the user device.

11. The user device of claim 8, wherein the processing device is configured to protect the confidential content by hiding or blurring at least a portion of the confidential content.

12. The user device of claim 8, wherein the processing device is further configured to:
receive, from the sensor device, a signal indicating the field of view of the person other than the user of the user device or the third-party device relative to the display device;
determine that the direction of the field of view is directed toward the display device based on the signal;
identify the confidential content displayed via the display device in response to determining that the field of view is directed toward the display device; and
protect the confidential content from view by the person other than the user of the user device or the third-party device in response to determining that the field of view is directed toward the display device.

13. The user device of claim 12, wherein the processing device is further configured to:
determine that the direction of the field of view of the person other than the user of the user device or the third-party device is directed away from the display device; and
reveal the confidential content for view via the display device in response to determining that the direction of the field of view is directed away from the display device.

14. The user device of claim 12, wherein the sensor device comprises a camera configured to capture an image associated with the third party device or an eye of the person other than the user and the processing device is configured to determine the direction of the field of view based on the image.

15. The user device of claim 12, wherein the sensor device is configured to monitor a movement of a muscle in an eye of the person other than the user and the processing device is configured to determine the direction of the field of view of the person based on the movement of the muscle in the eye.

16. A method comprising:
receiving, by a processor of a server, data indicating a first attribute of a first user device;
training, by the processor, a machine-learning algorithm to determine a plurality of risk profiles associated with a plurality of attributes using the first attribute of the first user device, wherein a risk profile indicates a likelihood of content on the first user device being viewed by a person other than a user of the first user device and is associated with at least one of a particular location, a particular application or program, a particular type of computing device, or a particular type of network;
determining, by the processor and using the machine-learning algorithm, a first risk profile associated with the first attribute of the first user device; and
transmitting, by the processor and to the first user device, data indicating the first risk profile, wherein the first risk profile is usable by the first user device for identifying confidential content displayed on the first user device and protecting the confidential content.

17. The method of claim 16, further comprising:
receiving, by the processor, data indicating a second attribute of a second user device;
determining, by the processor and using the machine-learning algorithm, a similarity between the first attribute of the first user device and the second attribute of the second user device based on a comparison of the first attribute and the second attribute;
determining, by the processor and using the machine-learning algorithm, a second risk profile associated with the second attribute of the second user device based on the similarity; and
transmitting, by the processor and to the second user device, data indicating the second risk profile, wherein the second risk profile is usable by the second user device for identifying confidential content displayed on the second user device and protecting the confidential content.

18. The method of claim 16, wherein the first attribute of the first user device comprises at least one of a location of the first user device, a type of the first user device, an application or program executed by the first user device, or a type of network connection associated with the first user device.

19. The method of claim 18, further comprising determining, by the first user device, an amount of the confidential content to protect or a duration of time to protect the confidential content based on the first risk profile.

20. The method of claim 16, further comprising:
  receiving, by the first user device and from the server, data indicating the first risk profile;
  identifying, by the first user device and in response to receiving the first risk profile, confidential content displayed via a display device of the first user device; and
  protecting, by the first user device and in response to receiving the first risk profile, the confidential content from view.

\* \* \* \* \*